Nov. 5, 1935.  G. I. RHODES  2,019,729
ELECTRIC RECTIFIER
Filed April 4, 1934    3 Sheets-Sheet 1
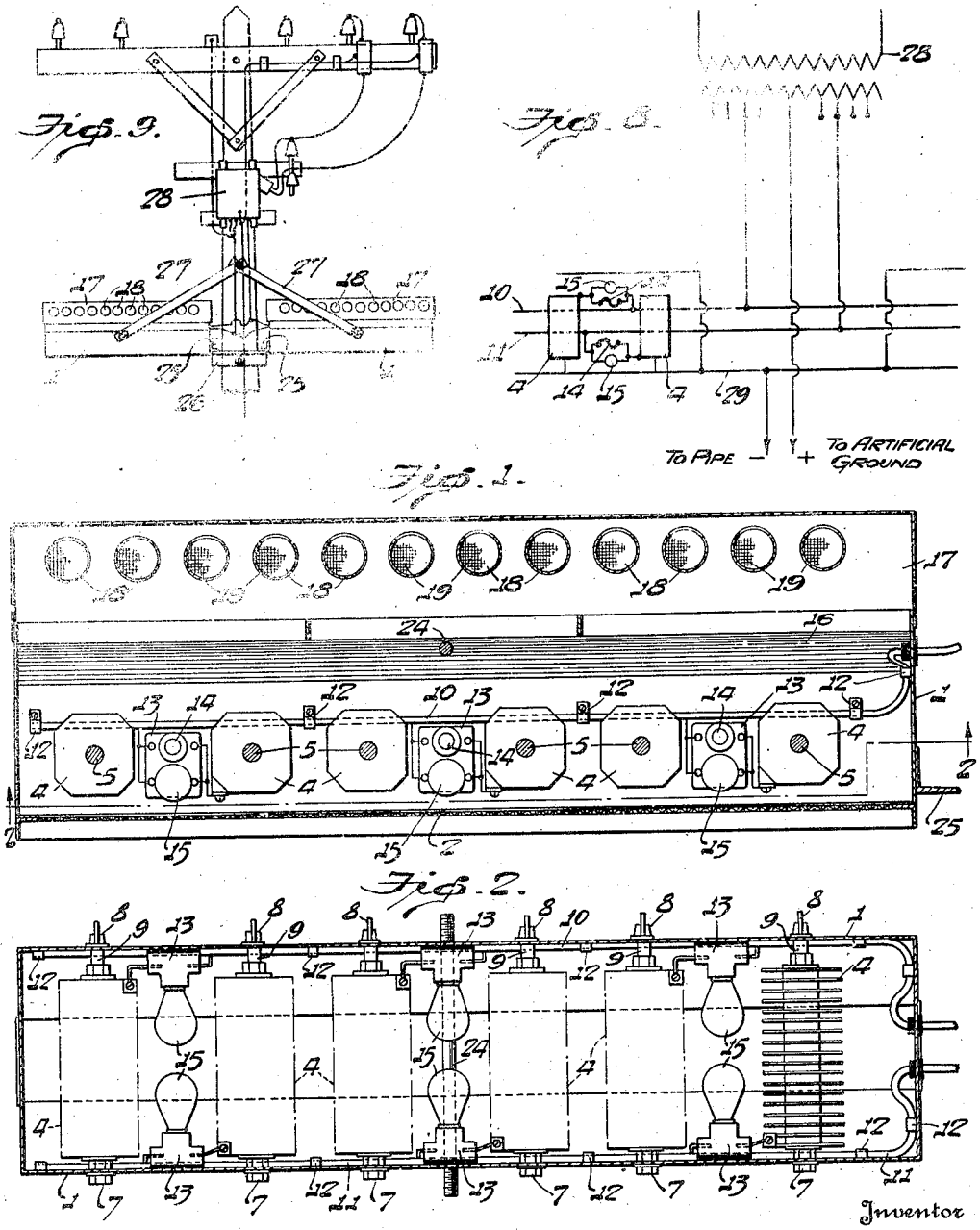

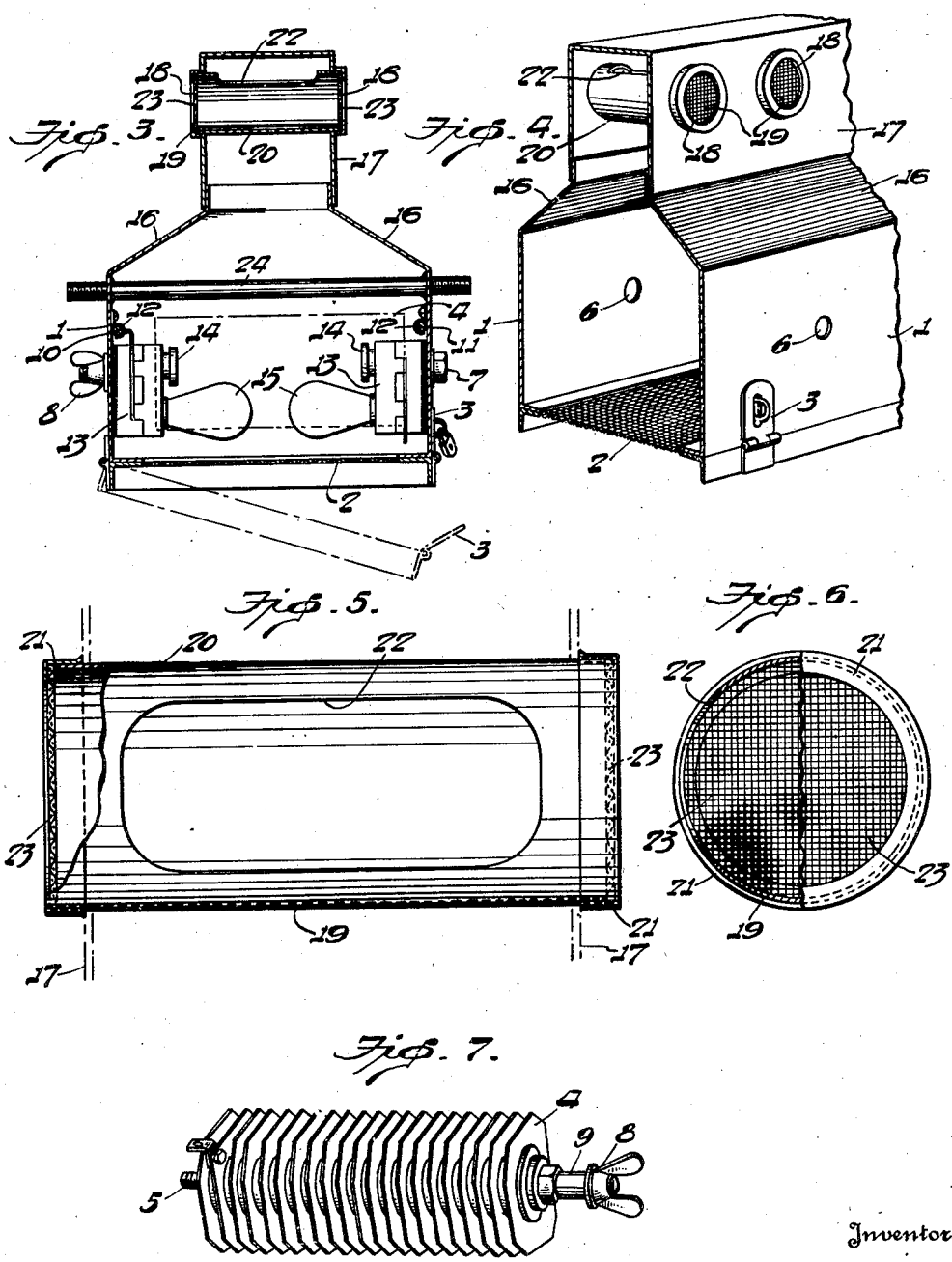

Nov. 5, 1935.  G. I. RHODES  2,019,729
ELECTRIC RECTIFIER
Filed April 4, 1934   3 Sheets-Sheet 3
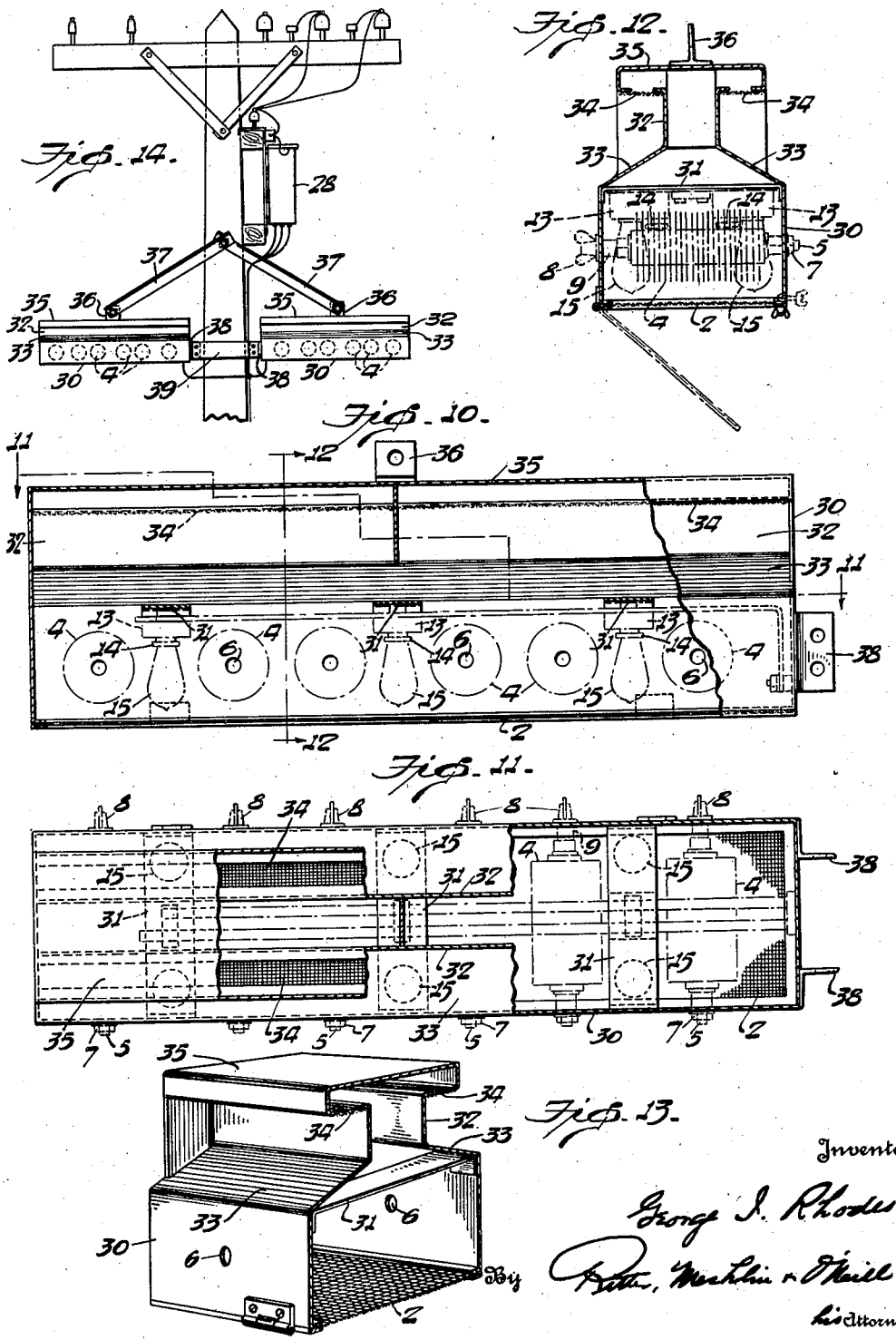

Patented Nov. 5, 1935

2,019,729

UNITED STATES PATENT OFFICE 2,019,729

ELECTRIC RECTIFIER

George I. Rhodes, Glen Ridge, N. J.

Application April 4, 1934, Serial No. 718,993

7 Claims. (Cl. 175—366)

My invention relates to electric rectifiers and especially to those which are well adapted for outdoor service.

The principal objects of the invention are so to construct the rectifier, which is designed to be supported out-of-doors on a pole or the like, that it will run sufficiently cool even when exposed to the summer sun, that its parts are readily accessible for repairs, and that its operating parts are effectively protected.

The principal feature of the invention consists, generally stated, in forming the rectifier with a casing in which a plurality of stacks of rectifier disks of copper oxide are mounted, the portion of the casing which is above the stacks of rectifier disks being spaced upwardly therefrom for a distance substantially greater than is required for mechanical clearance and being formed with an upward extension constituting a chimney.

Another feature of the invention consists in forming the upper part of the casing with inclined portions which are spaced upwardly from the stacks of rectifier disks and which converge toward the upward extension constituting the chimney portion of the casing.

Another feature of the invention consists in arranging the stacks of rectifier disks transversely of the casing and removably supporting them within it by means releasable from the outside of the casing, the bottom of the casing being open to permit the downward removal of the stacks of disks and means being provided for screening said opening.

A still further feature of the invention consists in the provision of screen sleeve devices which are associated with the chimney portion of the casing in such manner as to permit the free passage of air while preventing the entrance of rain and insects.

Other features of the invention, residing in advantageous arrangements of parts and details of construction, will hereinafter appear and be pointed out in the claims.

In the drawings, illustrating the preferred embodiments of the invention,

Figure 1 is a vertical central section of an electric rectifier embodying the invention.

Figure 2 is a sectional view on the line 2—2 of Figure 1, looking upwardly, certain of the stacks of rectifier disks being diagrammatically illustrated by dot and dash lines.

Figure 3 is a transverse sectional view of the rectifier shown in Figures 1 and 2.

Figure 4 is a perspective view of a portion of the rectifier casing shown in Figures 1 and 2.

Figure 5 is a detail view, partly in plan and partly in section, of one of the screen sleeves.

Figure 6 is a detail view, partly in elevation and partly in vertical section, of the screen sleeve shown in Figure 5.

Figure 7 is a detail perspective view of one of the stacks of rectifier disks.

Figure 8 is a wiring diagram showing the rectifier as employed in a system of electrical drainage for preventing corrosion of a pipe line or other linear metallic structure buried in the earth.

Figure 9 is an elevational view showing the manner of supporting the rectifier on a pole of a telephone line, such as is commonly found on the right of way of a cross country pipe line.

Figure 10 is a view, partly in elevation and partly in vertical section, of a modified form of the invention.

Figure 11 is a sectional view on the line 11—11 of Figure 10, looking downwardly.

Figure 12 is a transverse vertical section on the line 12—12 of Figure 10.

Figure 13 is a detail perspective view of a portion of the modified form of casing, and Figure 14 is a detail view showing the manner of supporting the modified form of rectifier upon a telephone pole or the like.

In the drawings, 1 indicates the casing of the rectifier, which is preferably made of sheet steel. The bottom of the casing is preferably open throughout and is adapted to be closed against the entrance of birds, insects or the like by means of a hinged screen or bottom member 2. Suitable means, such as the hasp device 3, are provided for normally retaining the screen member 2 in position for closing the opening in the bottom of the casing.

Disposed within the casing 1 is a series of stacks of rectifier disks 4 of copper oxide. These stacks of rectifier disks are well known. The stacks are arranged in spaced parallel relation, each being supported by an axially extending rod 5 that is threaded at its opposite ends, the rods 5 being of a length permitting their respective rectifier stacks to be removed and inserted through the opening in the bottom of the casing, without the necessity of disassembling them from the disks. The sides of the casing are preferably formed with a series of oppositely disposed holes 6. One end of each of the rods 5 projects outwardly through a corresponding opening 6 in a side wall of the casing and a nut 7 is applied to the end thereof. The opposite end of each rod 5 may advantageously be sustained in position by means of a sleeved thumb nut 8 whose end portion or sleeve 9 projects through the appropriate opening 6 in the casing side wall and has threaded engagement with the adjacent end of the associated rod 5. The wires 10 and 11, respectively, by which the stacks of rectifier disks are supplied with alternating current, enter the casing at one end and are respectively secured to opposite sides of the casing 1 by suitable wire clamps 12. Mounted within the casing 1 on opposite sides of the latter are cut-outs 13 corresponding in number to the rectifier stacks 4, each cut-out being connected to one of the wires 10 or 11 and to one of the stacks of rectifier disks. Each cut-out is preferably provided, in addition to a fuse 14, with a signal lamp 15 which is connected in parallel with the fuse and is adapted to light, when its associated fuse 14 fails. By this means, a visual indication is given, when any particular rectifier stack 4 ceases to function. To provide easy access through the bottom of the casing, as well as to attain compactness, without interfering with the ready removal and replacement of the stacks 4 of rectifier disks through the bottom of the casing 1, the cut-outs 13 are disposed opposite each other in horizontal alignment with the spaces between the rectifier stacks to which they are respectively connected, the lamps 15 extending horizontally toward each other and being spaced at a sufficient distance to permit removal and replacement.

The upper part of the casing 1 is constructed so as to give a chimney effect, whereby the heat of the sun is enabled to induce an increased circulation of air through the casing so that, with the same air temperature, the rectifier stacks will run at a lower temperature when the sun is shining than they will when the sun is not shining. To this end, the casing 1 is extended above the stacks 4 of rectifier disks for a substantially greater distance than is necessary to afford clearance for the stacks, the lateral portions 16 of its top preferably being inclined so as to converge upwardly and its central portion 17 rising above said inclined portions 16 to form a chimney, which preferably extends the full length of the casing. The restricted chimney extension 17, which is in open communication with the space above the rectifier stacks 4, is closed at its top and ends and is provided on opposite sides adjacent its upper end with suitable ventilating openings or vents 18 to permit the escape of warm air from the casing. To prevent rain from entering the casing 1 through the ventilating openings 18, as well as to prevent the ingress of insects and foreign matter, these openings are preferably guarded by sleeve devices 19, which are screened at their opposite ends. These screen sleeves may advantageously be formed from brass and consist of a central section 20 of tubing and end caps 21, the tube 20 being cut away at its upper side to form an elongated opening 22. The end caps, which are preferably spun so as to have a push fit on the ends of the tube 20, are in the form of rings whose openings are guarded by screens 23. These screens may be conveniently soldered to their respective rings. It will be appreciated that any rain which may enter through the screens 23 will be prevented by the tube 20 from reaching the rectifier stacks or other parts of the device performing electrical functions.

To enable the rectifier to be mounted on an outdoor pole, such as the telephone poles which are usually found along the right of way of a cross country pipe line, the side walls of the casing of the rectifier are preferably perforated to receive a transversely extending rod 24 which is threaded at its opposite ends for the reception of nuts and to provide the casing at one end on the outside with a flange portion or lug 25, which may extend entirely across the casing. The flange 25 may be conveniently formed as an angle iron, which is welded to the casing 1. This construction, as shown in Figure 9, permits the rectifier to be readily mounted upon an outdoor pole, it being merely necessary to provide the pole with supporting brackets 26, upon which the flanges 25 of the rectifier casing may rest and to connect the opposite ends of the transversely extending supporting rod 24 to the pole through suitable links or straps 27.

As shown in the wiring diagram, Figure 8, the rectifier is associated with a transformer 28 and where it is used in a system for protecting a pipe line from corrosion, it is connected to the pipe so as to maintain the latter negative, while positive current supplied from the transformer is connected to an artificial ground. Where there are a plurality of parallel pipe lines, the wire 29 through which the current from the rectifier flows may be provided with suitable taps leading to the additional lines of pipe.

In the modified form of construction illustrated in Figures 10 to 14, inclusive, the casing 30 is of somewhat different form from that heretofore described and the cut-outs 13, instead of being secured to the sides of the casing, are mounted upon and project downwardly from bars 31 extending transversely of the casing in vertical alignment with the spaces between adjacent stacks 4 of rectifier disks. In this form of the invention, the restricted chimney extension 32, which rises above the inclined top walls 33, has ventilating openings preferably extending the full length of the casing and guarded by screens 34, which may be horizontally disposed, as shown, or otherwise suitably positioned. Entrance of rain through the screens 34 is prevented by widening the top of the chimney extension of the casing so as to extend beyond the screens, as indicated at 35. To support the rectifier upon an outdoor pole, the casing 30 may be provided on the outside with an upwardly extending perforated lug 36 for cooperating with a supporting strap 37; and the casing may be also provided at one end with perforated lugs 38, whereby it may be bolted to bracket members 39 carried by the pole. In other respects, the details of construction of the modified form of the invention are the same as heretofore described and accordingly corresponding parts have been indicated by like reference numerals.

By my invention, copper oxide rectifiers may be mounted on outdoor poles and still run sufficiently cool, even when exposed to the summer sun in the southern parts of this country. Proper maintenance of copper oxide rectifiers requires that the stacks of disks be not permitted to exceed temperatures of about 125° F., and stacks of disks, such as are employed in my invention, develop a temperature rise of from 15° to 25° above the cooling air, when there is no restriction whatever in the circulation of the air and there is no external heat, such as sun heat. Obviously, therefore, on a 100° summer day or hotter, there is little or no margin in temperature even in the shade, if the stacks of disks are not to exceed a temperature of approximately 125° F. But, by my invention, wherein the casing is formed to provide a chimney effect, the heat of the sun induces an increased circulation of the air, with the result that, at a given air temperature, the rectifier stacks run at a lower temperature when the sun is shining than when the sun is not shining.

It will be appreciated that the rectifier is especially well adapted for mounting upon an outdoor pole. The signal lamps provided given visual indication, if the rectifier is not properly functioning, and indicate the particular stack of rectifier disks which is not in operation; and the parts are so disposed within the casing that they can be readily reached by a man on the pole, when the screen door at the bottom of the casing has been opened.

What I claim is:

1. An electric rectifier involving a casing, means for rectifying alternating electric current, and means for supporting said rectifying means within said casing, said casing being provided with ventilating openings enabling air to enter at a point below said rectifying means and to pass upwardly through said casing, said casing being also provided with a top portion having a wall spaced upwardly from said rectifying means and extending over the latter and having a chimney extension of restricted cross sectional area projecting upwardly beyond said wall, said chimney extension being provided at its upper end with means for preventing the entrance of rain, and certain of said ventilating openings serving to permit air to pass out of said casing adjacent the upper end of said chimney extension.

2. An electric rectifier involving a casing, a stack of copper oxide disks constituting means for rectifying alternating electric current, and means for supporting said stack within said casing, said casing having a bottom opening permitting the insertion and removal of said stack and being provided with a screen for normally guarding said opening, said casing being provided with a wall spaced upwardly from and extending over said stack and having a chimney extension projecting upwardly from said wall, and said casing being provided with a ventilating opening permitting air to pass out of said casing adjacent the upper end of said chimney extension.

3. An electric rectifier involving a casing, a plurality of stacks of disks constituting means for rectifying alternating electric current, means for supporting said stacks in spaced relation within said casing, and cut-outs mounted within said casing between adjacent stacks and electrically connected respectively to said stacks, each of said cut-outs involving a fuse and a lamp connected in parallel, said casing having an opening at the bottom permitting said stacks and fuses and lamps to be inserted and removed from below, said opening being normally guarded by a screen, and said casing being provided with a top portion spaced upwardly from said stacks and having a chimney extension through which air may pass from the casing.

4. An electric rectifier involving a casing, a plurality of stacks of copper oxide disks constituting means for rectifying alternating electric current, and means for removably supporting said stacks within said casing in horizontally spaced substantially parallel relation, said casing having a bottom opening permitting each of said stacks to be independently inserted and removed from below and being provided with a movable screen normally guarding said opening, said casing being formed with a top portion having upwardly convergent walls and a chimney extenwardly convergent walls and a chimney extension projecting upwardly beyond said walls, said convergent walls being spaced upwardly from said stacks, and said casing being provided with a ventilating opening permitting air to pass out of said casing adjacent the upper end of said chimney extension.

5. An electric rectifier involving a casing having side walls and formed with a top portion embodying a chimney extension, a plurality of stacks of disks constituting means for rectifying alternating electric current, and means for removably supporting said stacks within said casing in horizontally spaced substantially parallel relation, said supporting means cooperating with said side walls and projecting outwardly beyond the latter so as to be capable of manipulation from the outside of the casing, said casing having a bottom opening permitting each of said stacks to be independently inserted and removed from below and being provided with a movable screen normally guarding said opening, and said casing being formed with top walls spaced upwardly from said stacks and extending inwardly from the respective side walls and connecting said chimney extension to said side walls.

6 An electric rectifier involving a casing having side walls, end walls and a top, said casing being open at the bottom and provided with a hinged screen for normally guarding said opening, and said top being formed with a chimney extension through which air may pass from the casing, a plurality of stacks of disks constituting means for rectifying alternating electric current, means for removably supporting said stacks in substantially parallel spaced relation within said casing, and cut-out means mounted within said casing between adjacent stacks and respectively connected electrically to said stacks, the opening in the bottom of said casing being adapted to permit each of said stacks to be independently inserted and removed from below.

7. An electric rectifier involving a casing, means for rectifying alternating electric current, and means for supporting said rectifying means within said casing, said casing being provided with a bottom opening and having a screen for normally guarding said opening and being provided at its top with a chimney extension having oppositely disposed ventilating openings permitting air to pass out of said casing and being provided with means for guarding said ventilating openings, said last named means involving a tubular member and a plurality of caps respectively adapted to cooperate with the ends of said tubular member, each of said caps having a screen portion, and said tubular member having an opening communicating with the interior of said casing.

GEORGE I. RHODES.